United States Patent [19]
Ehrlich

[11] 3,788,682
[45] *Jan. 29, 1974

[54] TRAILER CONSTRUCTION

[75] Inventor: Donald J. Ehrlich, Monon, Ind.

[73] Assignee: Monon Trailer Inc., Monon, Ind.

[*] Notice: The portion of the term of this patent subsequent to Sept. 19, 1989, has been disclaimed.

[22] Filed: Apr. 1, 1971

[21] Appl. No.: 130,188

Related U.S. Application Data
[63] Continuation-in-part of Ser. No. 74,713, Sept. 13, 1970, Pat. No. 3,692,349.

[52] U.S. Cl. .................. 296/28 M, 52/264, 52/309
[51] Int. Cl. ...................... B62d 27/00, B62d 25/02
[58] Field of Search ..... 52/309, 615, 622, 261, 264, 52/282; 161/113, 115, 68, 69, 161; 105/422, 419, 418; 296/28 M

[56] References Cited
UNITED STATES PATENTS

| | | | |
|---|---|---|---|
| 3,030,256 | 4/1962 | Rosenthal | 161/161 |
| 3,216,167 | 11/1965 | Rorerts | 161/113 |
| 3,345,241 | 10/1967 | Shannon | 161/113 |
| 3,546,060 | 12/1970 | Hoppe | 161/161 |
| 3,692,349 | 9/1972 | Ehrlich | 52/497 |
| 2,600,140 | 6/1952 | Torseth | 296/28 M |
| 2,912,940 | 11/1959 | Baroni | 52/309 |
| 3,266,837 | 8/1966 | Stricker | 296/28 M |
| 3,295,278 | 1/1967 | Muhm | 52/309 |
| 3,330,080 | 7/1967 | Grieb | 52/309 |
| 3,393,920 | 7/1968 | Ehrlich | 52/615 |
| 3,415,028 | 12/1968 | Nerem | 52/615 |

*Primary Examiner*—John E. Murtagh
*Attorney, Agent, or Firm*—Roy H. Olson, et al.

[57] ABSTRACT

A vehicle body panel comprises a plywood core having glass fiber reinforced plastic coatings on opposite sides thereof. The core has holes therein so that during curing and heating of the resin, air bubbles at the interfaces of the coatings and the core will be forced into the holes. In addition, the plastic will be extruded into the holes to form a mechanical connection between the coatings. The panel is secured to a vehicle by an elongated channel rail that is joined to floor beams of the truck through connector bolts that are below the vehicle body's floor so as not to interfere with cargo placed therein.

5 Claims, 7 Drawing Figures

PATENTED JAN 29 1974 3,788,682
SHEET 1 OF 2
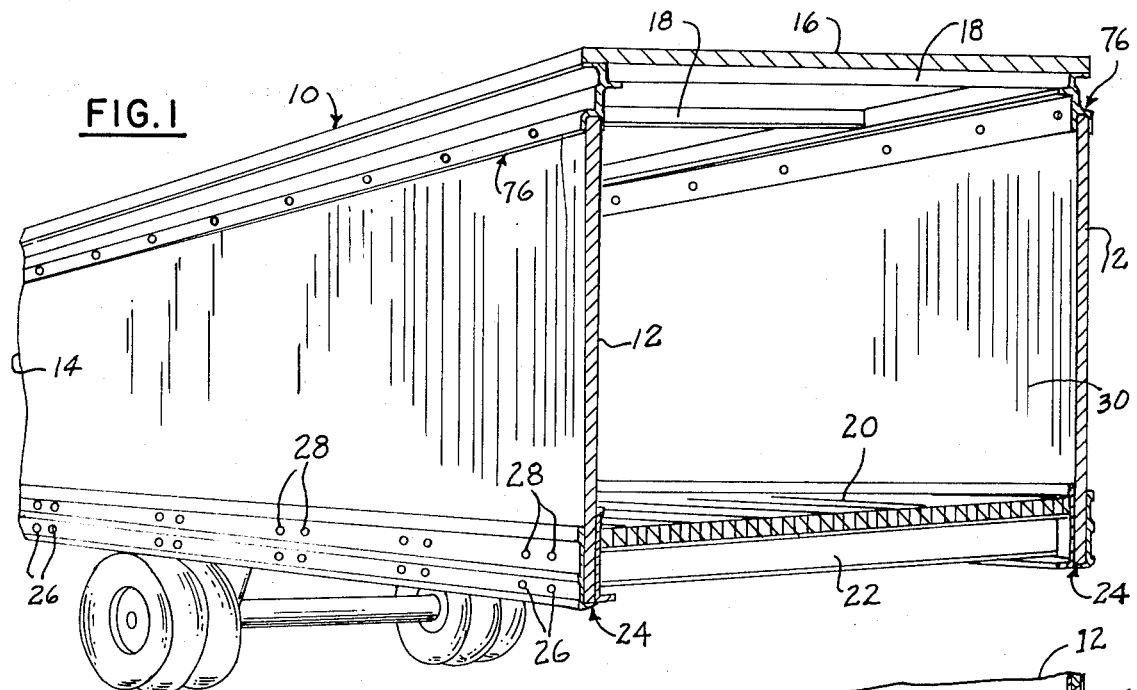
FIG.1
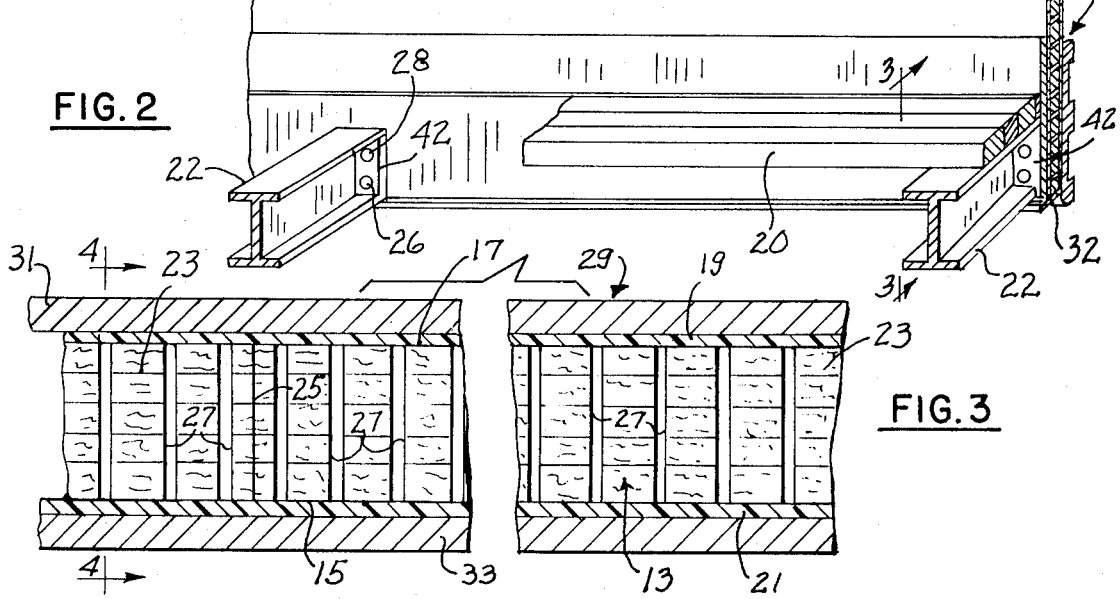
FIG.2
FIG.3
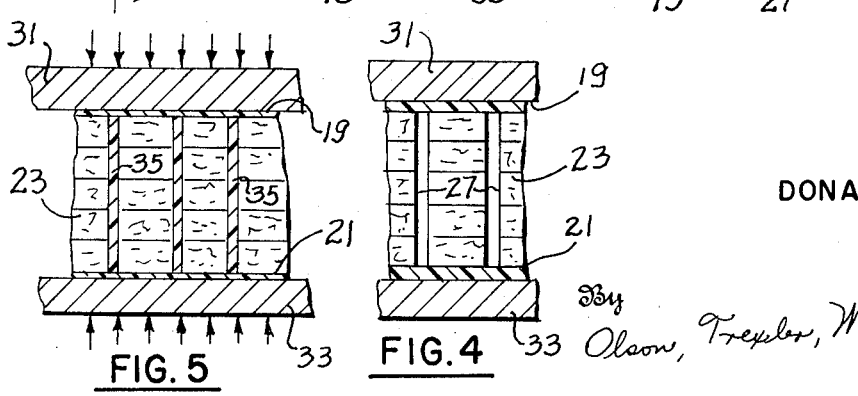
FIG.5  FIG.4
Inventor
DONALD J. EHRLICH
By Olson, Trexler, Wolters, & Bushnell
Attorneys

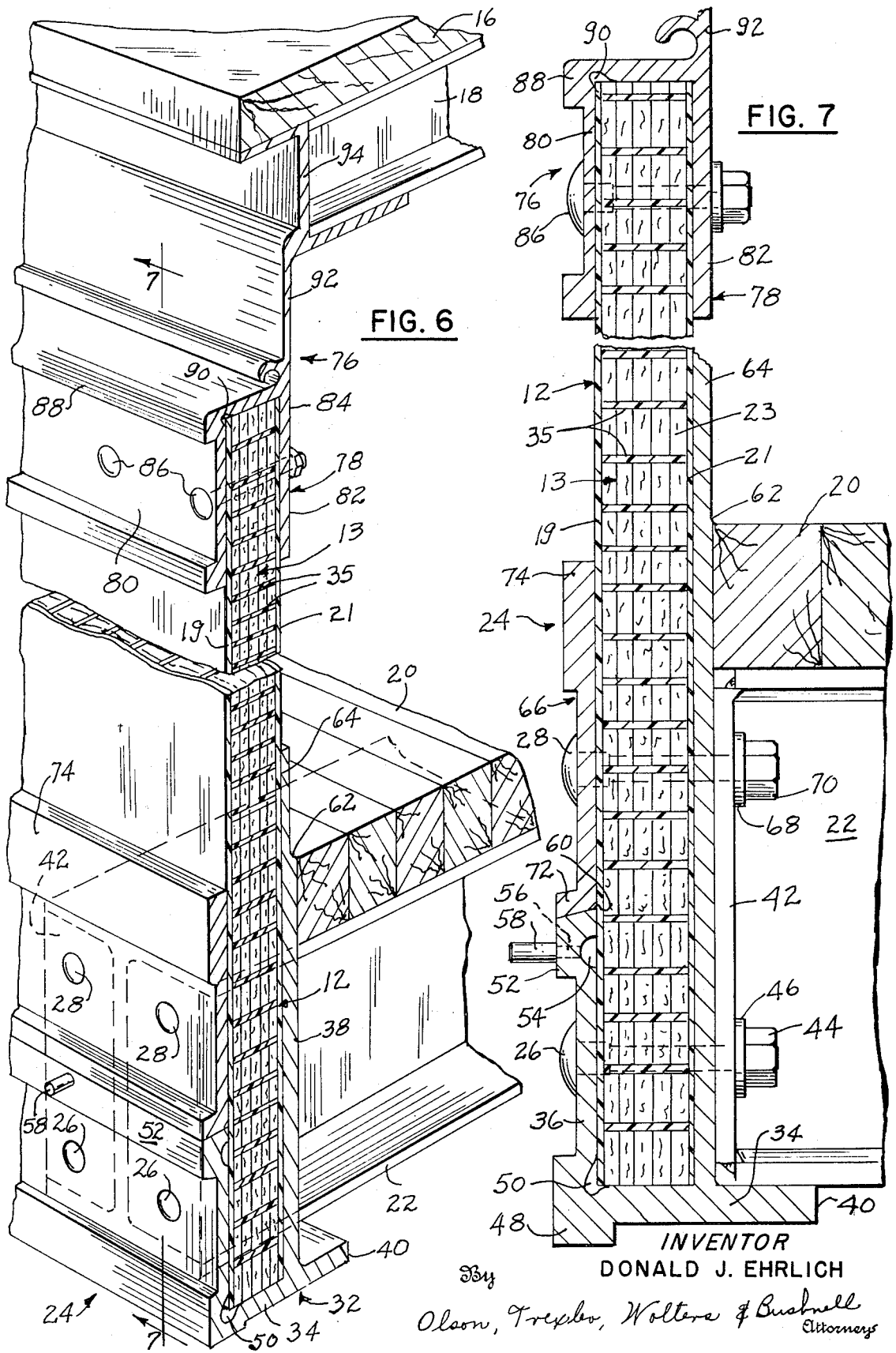

TRAILER CONSTRUCTION

This application is a continuation-in-part of my copending application Ser. No. 74,713 filed Sept. 13, 1970, now patent 3,692,349.

BACKGROUND OF THE INVENTION

This invention relates generally to vehicle body constructions and more particularly to side panels for relatively large vehicles, such as trailers and the like.

In my copending application there is disclosed and claimed an assembly for securing a side panel of a vehicle body, such as a trailer body, to the flooring of the vehicle in such a manner as to avoid interference with or damage to cargo placed within the vehicle while at the same time reliably mounting the panel in place. In such assembly there is a large surface contact between the assembly and the side panel together with a great number of fastening bolts, all of which are positioned below the vehicle's flooring. The side panel itself is one having a plywood core with coatings of glass reinforced plastic on opposite sides.

In the fabrication of the panels, the glass reinforced plastic is bonded by heat curing in place over the surfaces of the plywood core. The panels are quite massive and may be of the order of ten by forty feet in size, necessitating the use of several sheets of plywood placed edge-to-edge. However, where laminated panels of this size are being produced, there is a sometime problem in obtaining a uniform bond of the plastic to the plywood due to the presence of air bubbles that become entrapped between the plastic and the plywood core.

OBJECTS AND SUMMARY OF THE INVENTION

It is an object of this invention to provide a vehicle body panel of the foregoing type and a method of making the same in which the entrapment of air between the plastic coatings and the core is eliminated.

It is a further object of this invention to provide a vehicle body and method of the type stated in which there is formed a mechanical connection or joint between the plastic coating on the core.

It is a still further object of this invention to provide a novel vehicle body panel in combination with structure for readily and reliably securing the panel to the vehicle in a manner that prevents interference with or damage to cargo within the vehicle.

In accordance with the foregoing objects there is provided a panel core of plywood or the like having a series of closely spaced holes drilled therein and extending completely through the panel from one surface to the opposite surface. The glass fiber reinforced plastic coatings are heat cured to those opposite surfaces in a press of known type. In the curing and pressing, air bubbles that may be entrapped between the plastic and core surfaces are forced into the holes. At the same time the plastic from each coating is extruded into the holes whereby a plastic link or connection is made through the core from one plastic coating to the other plastic coating.

BRIEF DESCRIPTION OF THE DRAWINGS

In the drawings:

FIG. 1 is a perspective view of a trailer body which utilizes a pair of connecting assemblies and side panels constructed in accordance with the present invention;

FIG. 2 is an enlarged partially broken away perspective view of the flooring provided with the trailer body of FIG. 1;

FIG. 3 is a fragmentary sectional view of a step in the method of making the panel of the present invention;

FIG. 4 is a fragmentary sectional view taken along line 4—4 of FIG. 3;

FIG. 5 is a fragmentary sectional view of the completed panel but still in the curing press;

FIG. 6 is an enlarged partially broken away perspective view showing a connector assembly securing the side panel of the trailer body to the flooring thereof; and FIG. 7 is an enlarged vertical sectional view taken generally along line 7—7 in FIG. 6.

DETAILED DESCRIPTION

Referring now to the drawings a trailer body 10 includes a pair of rectangular side panels 12 which will be hereinafter more fully described. Suffice it to say for the present that each panel 12 is constructed of a core of plywood coated on opposite sides with glass fiber reinforced plastic. The trailer also includes an end panel 14, a top panel 16 supported on a plurality of transversely extending and spaced apart I-beams or like beams 18, and a floor 20 supported on a plurality of transversely extending and laterally spaced I-beams or similar beams 22.

In accordance with the present invention, a connecting assembly 24 is provided with and extends the entire length of the lower end of each side panel 12 for supporting the side panel and fastening the same to common ends of beams 22. As will be seen in more detail hereinafter, each of the connecting assemblies includes a lower plurality of longitudinally spaced bolts 26 and an upper plurality of longitudinally spaced bolts 28, all of which extend transversely through an associated side panel 12 and below the floor 20. In this manner, the connecting assemblies 24 eliminate the utilization of fastening bolts extending within the cargo carrying housing 30 of the trailer body and thereby eliminate damage to the cargo, which damage is otherwise caused by such obstructions.

Referring to FIGS. 6 and 7, a connecting assembly 24 is shown in detail and includes an elongated integrally constructed channeled rail 32 which has a substantially U-shaped cross-section and which extends the length of side panel 12. The channeled rail includes a horizontal base or bight portion 34 for receiving and supporting the downwardly facing longitudinal edge of side member 12 and a pair of laterally spaced side walls 36 and 38 which are formed with and extend upwardly from opposite longitudinal edges of base 34 for engaging opposite sides of the side panel. A major portion of the channeled rail extends below floor 20 for securing the rail and therefore side panel 12 to common ends of I-beams 22.

The I-beams 22 are supported at opposite ends on inwardly extending flanged support members 40 which are formed with and extend the length of respective inner side walls 38 at the bottom thereof. A rectangular plate 42 (FIGS. 2 and 5) is welded or otherwise suitably mounted to each end of each I-beam 22 and is positioned in confronting engagement with the otherwise exposed surface of inner side wall 38 when the I-beam is supported on flange members 40.

As illustrated in FIGS. 6 and 7, each of the plates 42 includes a pair or other suitable number of spaced-apart apertures which cooperate with aligned apertures extending through the side walls 36, 38, and side panel 12 for receiving the shank portions of bolts 26. In this manner, the bolts 26 along with respective cooperating nuts 44 and washers 46 not only secure one end of beam 22 to channeled rail 32, as illustrated in FIG. 4, but also providing squeezing type action to the side walls 36 and 38 of the channeled rail, so that the latter may more rigidly and securely support side panel 12. An elongated joint 48 having a substantially rectangular cross-section is provided for joining the outer side wall 36 of channeled rail 32 to base or bight portion 34 and includes an angled substantially U-shaped groove or channel 50 extending into the joint at the inward joining corner of the side wall and bight portion.

This groove or channel 50 provides a certain degree of foldability or flexibility to joint 48 so that the entire side wall 36 is moved in a substantially uniform lateral manner against the side panel 12 when the bolts 26 are tightened. Thus, the side wall 36 is maintained substantially vertical and parallel to the side panel 12 when it is squeezed inwardly, namely toward the wall 38. In this manner, the entire panel engaging surface of the side wall 36 is maintained in substantially complete contact with the side panel regardless of required manufacturing tolerances and therefore more reliably holds the panel within the channeled rail. In the same light, it should be noted that the inner side wall 38 extends a substantial distance above and below floor 20 so as to present an even greater engaging surface to the opposite side of the panel 12, and thereby further adds to the securement thereof.

In order to prevent rain water or other such environmental entities from entering within the channeled rail 32 and de-laminate or otherwise damage side panel 22, a substantially rectangular and elongated outwardly extending flange or shoulder 52 is formed with the top of side wall 36 and extends the length thereof. The panel engaging surface of this flange or shoulder includes a longitudinal channel or groove 54 which is inwardly opening and is adapted to receive a sealant such as grease, which may be inserted therein through a transverse opening 56 provided through shoulder 52 and communicating with channel or groove 54. A grease gun or other suitable means 58 may be provided for this purpose. In this regard, it should be noted that the top and adjoining right-hand surfaces of flange 52, as viewed in FIG. 7, meet at an angle slightly less than ninety degrees, so as to define a toothed edge 60 which bites in and aggressively engages the outer surface of an associated panel 12 when the bolts 26 are tightened and thereby aids the sealant in preventing the environmental entities from entering within the channeled rail 32.

The inner side wall 38 of the channeled rail 32 extends upwardly beyond the level of floor 20 where it defines an inwardly and upwardly inclined horizontal shoulder 62 which aids in preventing dust or the like from entering between the floor 20 and side wall 38. Shoulder 62 merges with a substantially thinner upwardly extending side wall portion 64 which presents additional engaging surface area to the side panel 12 for further aiding in the support thereof.

Each connecting assembly 24 further includes an elongated substantially rectangular plate member 66 in the form of a side or rub rail which is mounted on the external surface of an associated side panel 12 adjacent to and above side wall 36 and which horizontally extends the length of the side wall. A plurality of longitudinally spaced apertures are provided transversely through plate member or rub rail 66 and respectively cooperate with aligned apertures provided through the side panel 12, side wall 38 of the channeled rail 32 and engaging rectangular plate 42 for receiving the shank portions of bolts 28 which, along with cooperating washers 68 and nuts 70, aid in fastening the rub rail, side panel, side wall and rectangular plate together. In this manner, the bolts 28 extend below floor 20 so as not to interfere with cargo placed thereon and provide an additional row of fastening means for further securing the side panel 12 within channeled rail 32, as well as to secure common ends of beams 22 to the side panel.

The lower end of plate member 66 includes a protruding shoulder portion 72 having a bottom surface which is formed to cooperatively engage the slightly inclined top surface of flange or shoulder 52 for further aiding in sealing the channeled rail 32. In addition, the top longitudinal edge of plate member 66 is formed with a substantially thicker outwardly extending rectangular flange or shoulder portion 74, which, because of its projecting manner, receives most of the scuffs, scratches or other similar types of damage which is so often received by the side of a vehicle. Therefore, damage directly to the side panel 12 is substantially eliminated. In the event that rub rail 66 becomes damaged to the degree that it detracts from the looks of the trailer body 10, it may be easily removed and replaced with a new rub rail without the necessity of disassembling the entire connecting assembly. In addition, if the side panel 12 requires patching, the rub rail may be removed for making the panel more accessible.

Briefly returning to FIG. 1, trailer body 10 is shown to include a pair of upper connecting assemblies 76 which are provided for supporting the top longitudinal ends of side panels 12 as well as the I-beams 18 and top panel 16. As best seen in FIGS. 6 and 7, connecting assembly 76 includes an elongated channeled rail 78 having an inverted U-shaped cross-section which is defined by a pair of downwardly extending side walls 80 and 82 joined at their top longitudinal edges by a base or bight portion 84. The top longitudinal end of panel 12 is positioned within the channeled rail 78 and is held thereat by a plurality of bolts or other similar fastening means 86 which extend through cooperating apertures in the side walls 78, 80, and side panel 12.

Like channeled rail 32, channeled rail 78 includes a flexible joint 88 which joins the side wall 80 and base or bight portion 84, and which includes a longitudinal channel or groove 90 formed at the inner corner therein so as to allow the side wall 80 to fully engage the side panel 12 when bolts 86 are tightened.

Assembly 76 further includes an inwardly extending right-angled flange 92 extending upwardly from and formed with the top longitudinal edge of side wall 82 for supporting common ends of transverse I-beams 18. In addition, an outwardly extending right-angled flange 94 extending upwardly from and formed with the vertex of flange 92 is provided for aiding support beams 18 in supporting the top panel 16, all of which are suitably secured together.

Referring now more particularly to the panel 12, it will be seen that the panel 12 comprises a central form-sustaining core 13 of a fibrous material, such as plywood, having opposed flat surfaces 15, 17 and coatings of plastic-containing layers 19, 21 on the respective surfaces 15, 17 and coextensive therewith. The coatings are thin as compared to the thickness of the core. Since the panel 12 is generally quite massive and may be, for example, about 10 feet by 40 feet, the core 13 may be composed of a plurality of core members 23, 23 having their edges abutting as at 25 (FIG. 3). In a typical arrangement the core may be of plywood and comprise a number of sheets thereof laid edge-to-edge to build up the length and width of the panel to the desired dimensions. Furthermore, the coatings or layers 19, 21 may be of fiber reinforced resin of a suitable type. A polyester or polyether resin reinforced with glass fibers is suitable.

In making the panel, the plywood core members 23 are first drilled to form a series of holes 27 that are closely spaced and are distributed over the length and width of the core members. The holes 27 extend completely through the core members 23 from one surface 15 to the other surface 17 and are generally perpendicular to those surfaces.

The laminated panel 12 is made in a molding press 29 of conventional construction that includes opposed members or platens 31, 33. Glass fibers are deposited into the press after which the liquid resin is supplied to the press in sufficient quantity to impregnate the fibers and produce a coating 21 of the requisite thickness. Thereafter the plywood core members 23 are placed in the press and the glass fibers and resin for the coating 19 are introduced into the press. The prepared constituents of the panel are then ready for curing and pressing, as shown in FIG. 3.

Heat is applied to the mold platens and pressure from the platens 31, 33 is directed against the laminate so that the resin cures and hardens and forms a bond to the core members 23 at the surfaces 15, 17. During the heating and pressing, air bubbles at the surfaces 15, 17 are forced by the pressure of the platens into the holes 27 so that a uniform and unobstructed bond is provided between the coatings 19, 21 and the core 13 throughout the surfaces 15, 17. The pressure also forces or extrudes the resin into the holes 27, as best seen in FIG. 3, so that a series of hardened resinous links or connections 35 are distributed longitudinally and transversely throughout the panel that results in the coatings 19, 21 being mechanically locked together independently of the bonds of the coatings to the plywood cores.

The invention is claimed as follows:

1. In a trailer body having a pair of side panels, and a floor positioned above and supported by a plurality of beams extending transversely of said side panels, the improvement comprising a pair of connecting assemblies for securing opposite ends of said beams to said side panels, each of said connecting assemblies including an elongated vertically extending channeled rail for receiving and supporting the lower margin of one of the said side panels, said rail having spaced walls for supporting opposite sides of said side panel, and fastening means extending transversely through said side walls and associated side panel and connecting with common ends of said beams for securing said beams to said rail and therefore said side panel, said fastening means being below said floor whereby not to interfere with cargo placed on the floor of said trailer, each panel comprising a form sustaining core and plastic-containing layers bonded to opposite surfaces of the core, each panel being relatively elongate with said core comprising a plurality of relatively rigid, generally flat core elements that are in transverse face-to-face contact and in edge-to-edge abutting relationship, the plastic of said layers spanning the abutting edges of the core elements, said core elements each also having a multiplicity of holes closely spaced throughout the length and width of the core and extending from one of said surfaces to the other and providing internal air bubble escape areas and with the plastic of each layer extending into said holes so that the plastic in said holes including those closely adjacent said abutting edges cooperate to rigidify the body panel.

2. In a trailer body according to claim 1, the plastic of one layer being joined to the plastic of the other layer in said holes to form a multiplicity of mechanical connections between the two layers.

3. In a trailer according to claim 1, the plastic layers being thin as compared to the thickness of the core.

4. In a trailer according to claim 2, said core being a fibrous sheet, and each plastic layer being comprised of fiber reinforced plastic.

* * * * *